(12) United States Patent  (10) Patent No.: US 7,665,568 B2
Doperalski et al.  (45) Date of Patent: Feb. 23, 2010

(54) VEHICLE HAVING MULTIPLE-PIECE PIVOT SHAFT ASSEMBLY

(75) Inventors: Michael J. Doperalski, Sussex, WI (US); John F. Wolanski, Menomonee Falls, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 246 days.

(21) Appl. No.: 11/932,296

(22) Filed: Oct. 31, 2007

(65) Prior Publication Data

US 2009/0107753 A1    Apr. 30, 2009

(51) Int. Cl.
*B60K 17/00* (2006.01)

(52) U.S. Cl. .................. 180/358; 180/227; 180/231; 180/366; 411/338; 411/166; 403/62; 403/22

(58) Field of Classification Search .................. 180/227, 180/231, 358, 366, 373; 280/288, 284, 285; 411/389, 87, 89, 90, 338, 166; 403/22, 43, 403/62, 65
See application file for complete search history.

(56) References Cited

U.S. PATENT DOCUMENTS

| | | | | |
|---|---|---|---|---|
| 3,966,006 A * | 6/1976 | Cullinan | ..................... | 280/284 |
| 4,558,761 A | 12/1985 | Boyesen | | |
| 4,655,310 A | 4/1987 | Hoshi | | |
| 4,671,375 A | 6/1987 | Oike et al. | | |
| 4,889,458 A * | 12/1989 | Taylor | ........................ | 411/383 |
| 5,487,443 A | 1/1996 | Thurm | | |
| 5,713,686 A * | 2/1998 | Maughan | ..................... | 403/46 |
| 5,749,591 A | 5/1998 | Thurm | | |
| 5,960,902 A | 10/1999 | Mancini et al. | | |
| 5,996,718 A | 12/1999 | Desrosiers | | |
| 6,131,684 A * | 10/2000 | Ticknovich | ................. | 180/227 |
| 6,189,638 B1 | 2/2001 | Ito et al. | | |
| 6,253,868 B1 | 7/2001 | Horii et al. | | |
| 6,315,071 B1 * | 11/2001 | Gogo | .......................... | 180/219 |
| 6,357,546 B1 | 3/2002 | Crosby, Jr. | | |
| 6,378,644 B1 | 4/2002 | Brown et al. | | |
| 6,450,282 B1 | 9/2002 | Gogo et al. | | |
| 6,860,353 B2 | 3/2005 | Miyashiro | | |
| 6,913,101 B2 | 7/2005 | Uneta et al. | | |
| 7,163,365 B2 * | 1/2007 | Manaka et al. | .............. | 411/374 |
| 7,354,054 B2 * | 4/2008 | Pazdirek | .............. | 280/124.152 |
| 2003/0015366 A1 | 1/2003 | Buell et al. | | |
| 2006/0065463 A1 | 3/2006 | Handa et al. | | |
| 2006/0278454 A1 * | 12/2006 | Maggio | ...................... | 180/164 |
| 2008/0302589 A1 * | 12/2008 | Ore | ............................. | 180/227 |

* cited by examiner

*Primary Examiner*—Ruth Ilan
(74) *Attorney, Agent, or Firm*—Michael Best & Friedrich LLP

(57) ABSTRACT

The present invention provides a vehicle including a frame, a rear wheel, a swingarm coupling the rear wheel to the frame, and a pivot shaft assembly rotatably coupling the swingarm to the frame. The pivot shaft assembly includes a first shaft having a non-circular outer surface engageable with a corresponding non-circular aperture in the frame. The pivot shaft assembly also includes a second shaft threaded to one end of the first shaft. The second shaft pivotably supports one side of the swingarm with respect to the frame. The pivot shaft assembly further includes a third shaft threaded to the other end of the first shaft. The third shaft pivotably supports the other side of the swingarm with respect to the frame.

16 Claims, 9 Drawing Sheets

VEHICLE HAVING MULTIPLE-PIECE PIVOT SHAFT ASSEMBLY

FIELD OF THE INVENTION

The present invention relates to vehicles, and more particularly to two or three-wheeled vehicles and power transmission components.

BACKGROUND OF THE INVENTION

Motorcycles typically include an engine, a transmission that receives power from the engine, and a power transmission assembly that transfers power from the transmission to a rear wheel of the motorcycle. Such power transmission assemblies can include sprockets coupled to the output shaft of the transmission and the rear wheel, respectively, which in turn are coupled by a chain. Other power transmission assemblies can include pulleys coupled to the output shaft of the transmission and the rear wheel, respectively, which in turn are coupled by a belt.

SUMMARY OF THE INVENTION

The present invention provides, in one aspect, a vehicle including a frame including a non-circular aperture, a rear wheel, a swingarm coupling the rear wheel to the frame, and a shaft having a non-circular outer surface engageable with the corresponding non-circular aperture in the frame. The shaft rotatably couples the swingarm to the frame.

The present invention provides, in another aspect, a pivot shaft assembly configured to pivotably couple a rear swingarm to a frame of a vehicle. The pivot shaft assembly includes a first shaft having a non-circular outer surface configured to be engaged with a corresponding non-circular aperture in the frame. The pivot shaft assembly also includes a second shaft threaded to one end of the first shaft. The second shaft has a shank configured to pivotably support one side of the swingarm with respect to the frame. The pivot shaft assembly further includes a third shaft threaded to the other end of the first shaft. The third shaft has a shank configured to pivotably support the other side of the swingarm with respect to the frame.

The present invention provides, in yet another aspect, a method of assembling a rear swingarm to a frame of a vehicle. The method includes providing a shaft having a non-circular outer surface, positioning the shaft within a corresponding non-circular aperture in the frame to at least partially support the shaft on the frame, and pivotably supporting the swingarm with the shaft.

Other features and aspects of the invention will become apparent by consideration of the following detailed description and accompanying drawings.

BRIEF DESCRIPTION OF THE DRAWINGS

FIG. 2b is an enlarged, side view of the rear portion of the vehicle shown in FIG. 2a.

FIG. 3 is a cross-sectional view of the jackshaft and pulley assembly taken along line 3-3 in FIG. 2a.

FIG. 4 is a cross-sectional view of the jackshaft taken along line 4-4 in FIG. 2a.

FIG. 5b is an enlarged, side view of the rear portion of the vehicle shown in FIG. 5a.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
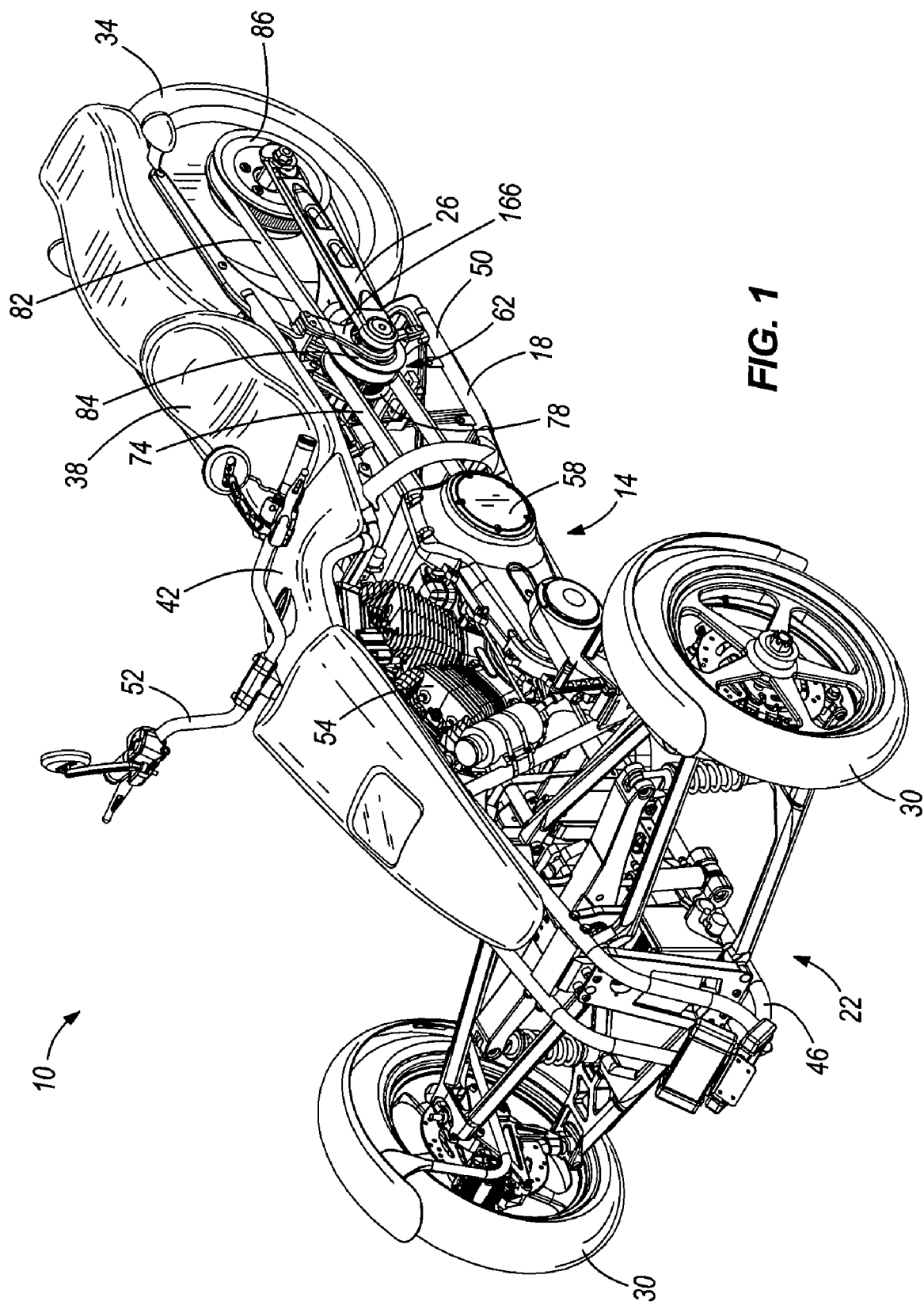
FIG. 1 is a front perspective view of a vehicle embodying the present invention.

FIG. 1 illustrates a 3-wheeled vehicle 10 including a drive assembly 14, a frame 18, a front suspension assembly 22, a rear swing arm 26, two front wheels 30, a rear wheel 34, a seat 38, and a fuel tank 42. The frame 18 supports the drive assembly 14, the front suspension assembly 22, the swing arm 26, the seat 38, and the fuel tank 42. The front suspension assembly 22 is pivotably supported at a front end 46 of the frame 18 and supports the two front wheels 30. The swingarm 26 is coupled to the frame 18 at a rear end 50 of the frame 18 and rotatably supports the rear wheel 34. The seat 38 is coupled to the frame 18 and is configured for supporting a rider. The fuel tank 42 is supported by the frame 18 and provides fuel to the drive assembly 14. The vehicle 10 also includes a pair of handle bars 52 for steering the vehicle 10.

The drive assembly 14 is coupled to the frame 18 beneath the fuel tank 42 between the front wheels 30 and the rear wheel 34 of the vehicle 10. The drive assembly 14 includes an engine 54 and a transmission 58, which comprise distinct, independent components of the drive assembly 14. In the illustrated construction, the engine 54 comprises a V-twin engine 54 supported by the frame 18 forward of the transmission 58. Alternatively, other engine configurations may be utilized. The engine 54 includes an output shaft (not shown), such as a crankshaft, which includes a primary drive sprocket (not shown) for driving a primary chain (not shown) in a conventional manner to power the transmission 58.

Figure 2A:
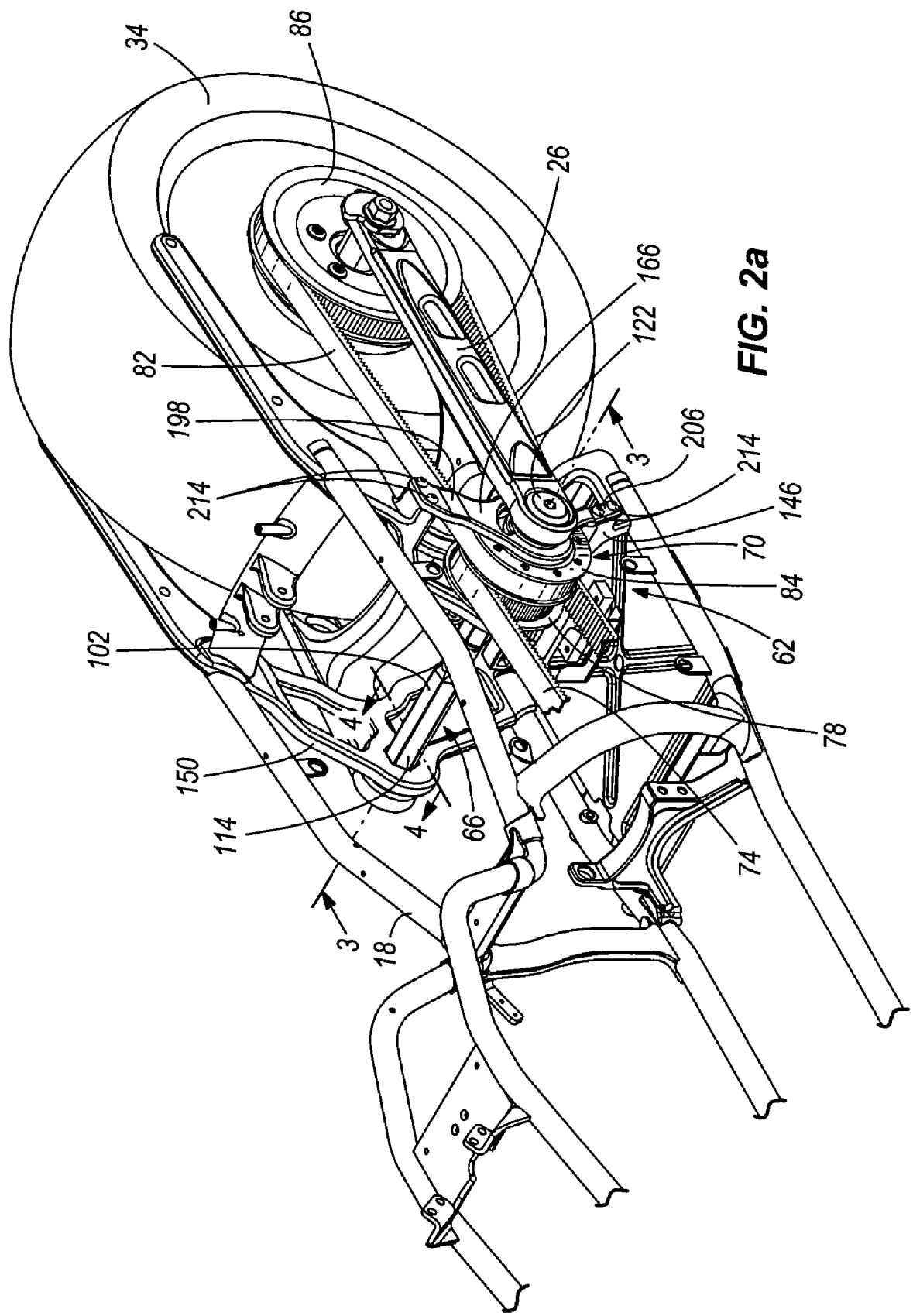
FIG. 2a is a front perspective view of a rear portion of the vehicle of FIG. 1, with portions removed, illustrating a jackshaft and pulley assembly coupled to the frame of the vehicle.
Figure 3:
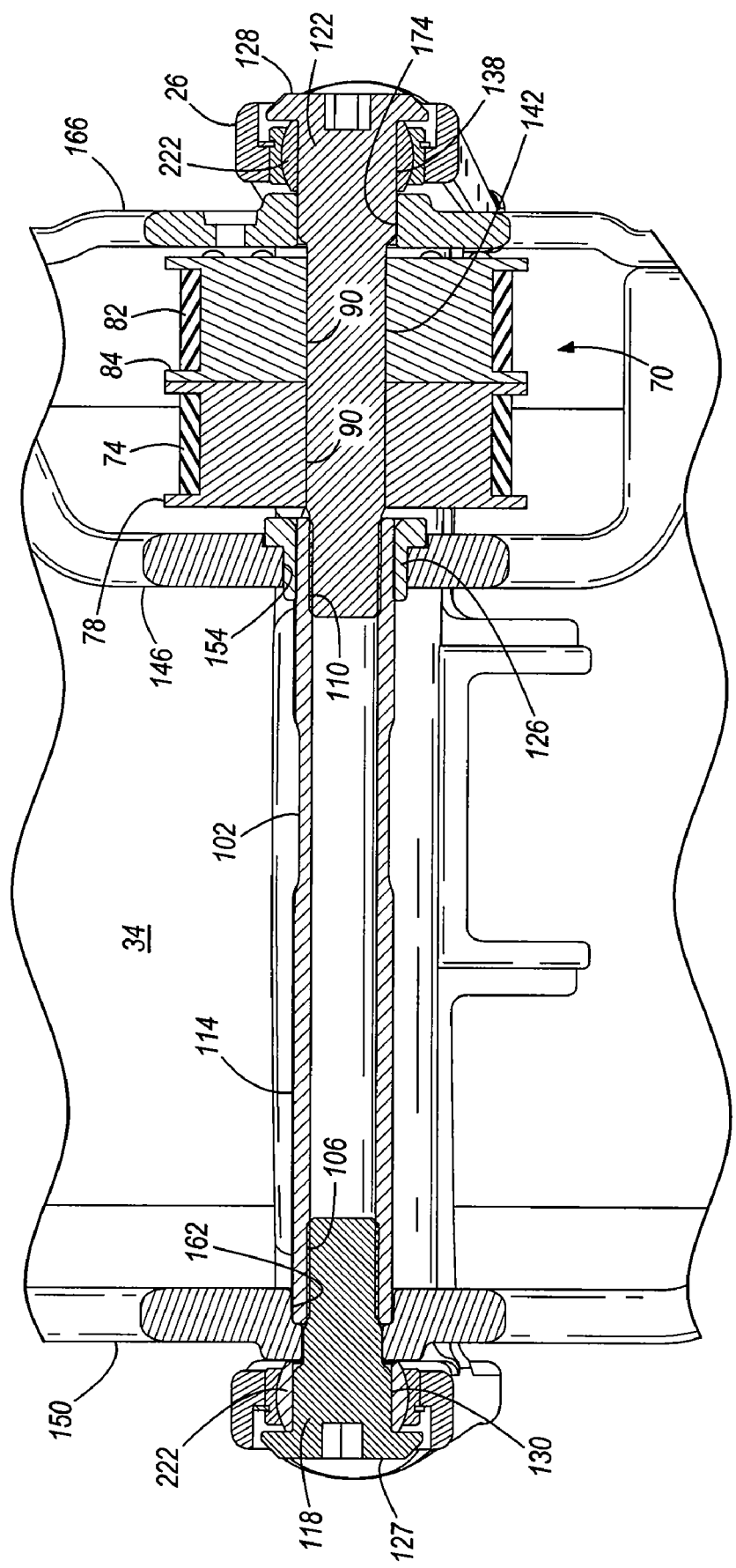
Figure 4:
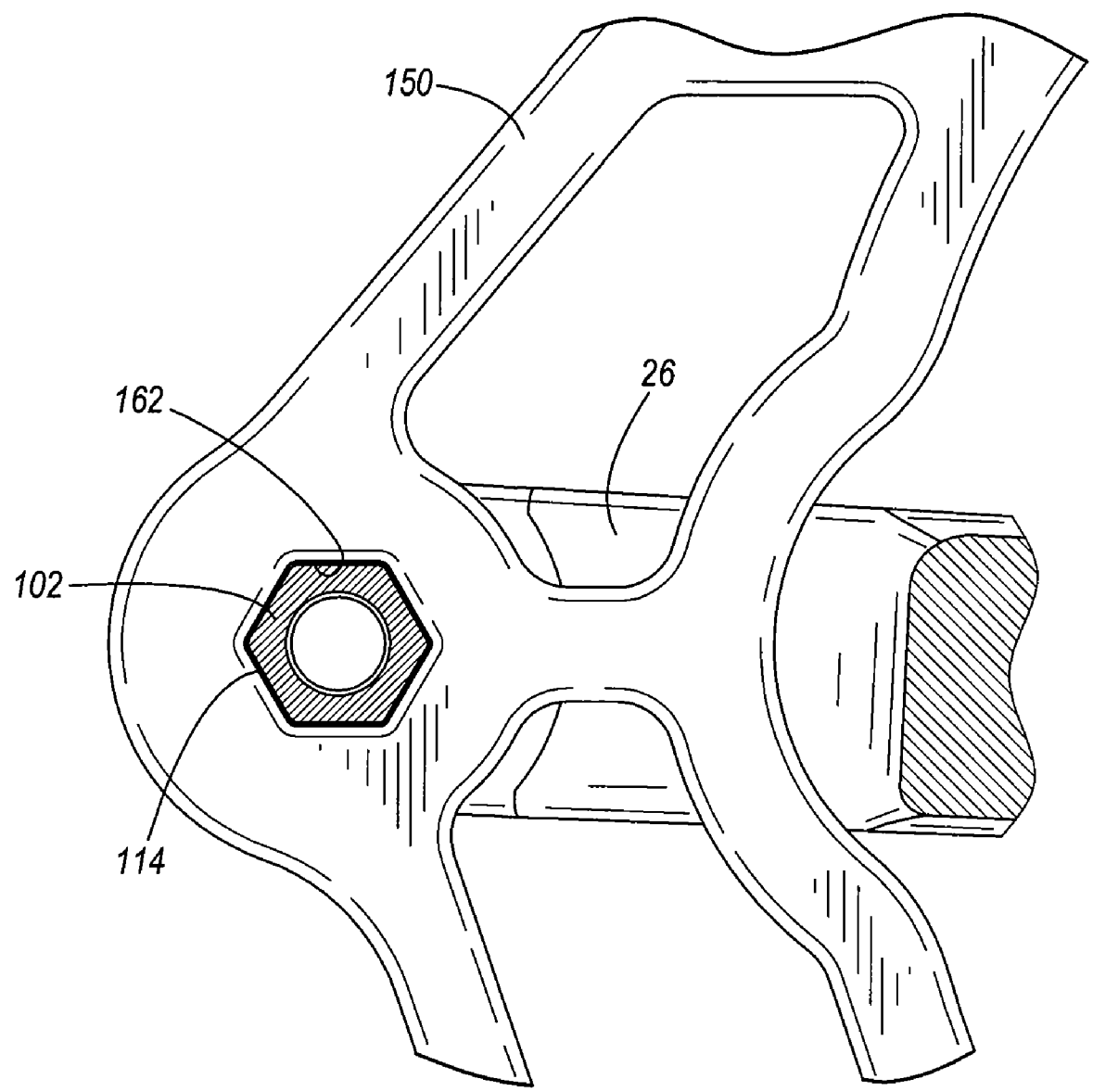
Figure 7:
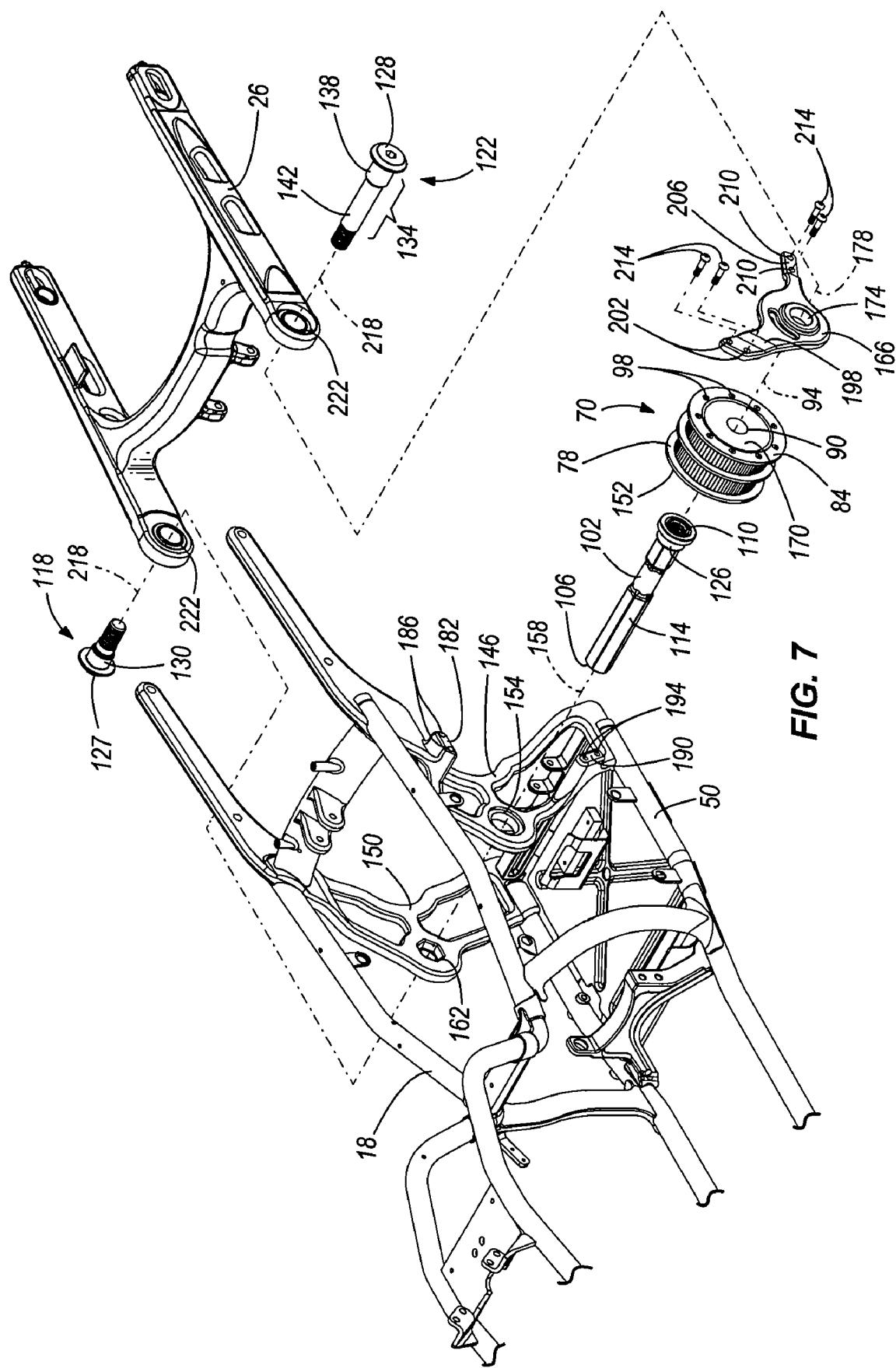
FIG. 7 is an exploded, front perspective view of the rear portion of the vehicle of FIG. 1, with portions removed, illustrating the jackshaft, pulley assembly, and a swingarm.

With continued reference to FIG. 1, the vehicle 10 includes a power transmission assembly 62 coupling the transmission 58 and the rear wheel 34. In the illustrated construction, the power transmission assembly 62 includes a pivot shaft assembly in the form of a jackshaft 66 coupled to the frame 18 and positioned between the transmission 58 and the rear wheel 34, a pulley assembly 70 supported for rotation on the jackshaft 66, a first belt 74 coupling a pulley (not shown) on the output shaft of the transmission 58 and a first pulley 78 of the pulley assembly 70, and a second belt 82 coupling a second pulley 84 of the pulley assembly 70 and a pulley 86 mounted to the rear wheel 34 (see also FIG. 2a). As shown in FIGS. 3 and 7, each of the pulleys 78, 84 includes an aperture 90 defining a rotational axis 94 of the individual pulley 78, 84. The individual pulleys 78, 84 comprising the pulley assembly 70 are connected to each other via a plurality of fasteners 98 extending axially through the pulleys 78, 84 so that the pulleys 78, 84 rotate together as a single unit. Alternatively, the pulley assembly 70 may be configured as one piece having two belt surfaces, each of which is configured to receive a separate belt. As a further alternative, the pulley assembly 70 may be configured as two interconnected sprockets, each configured to receive a chain rather than a belt.

Figure 6:
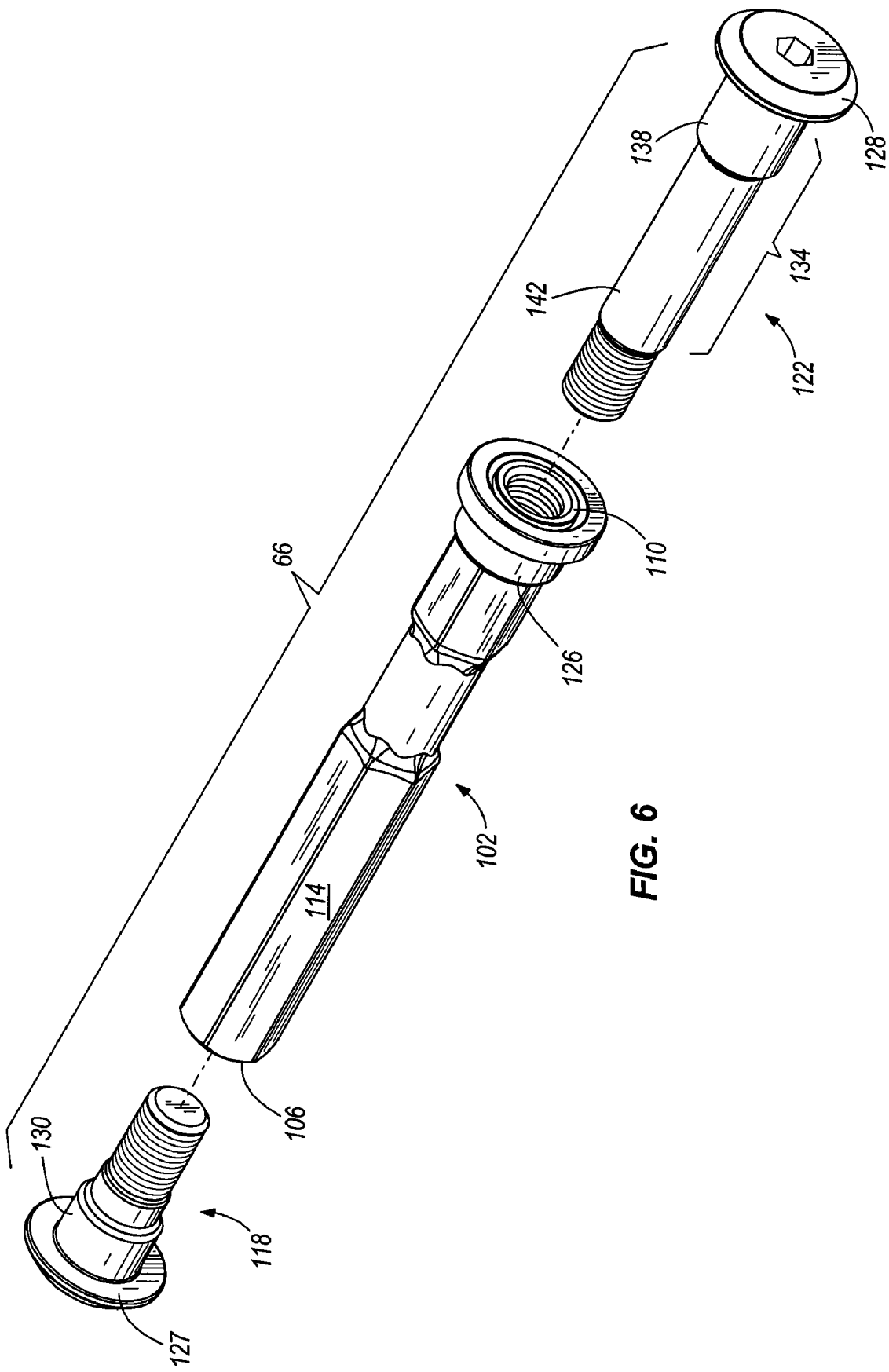
FIG. 6 is an exploded perspective view of the jackshaft of the vehicle of FIG. 1.

With reference to FIGS. 3, 6, and 7, the jackshaft 66 is configured as a three-piece shaft including a middle portion 102 having respective threaded ends 106, 110 and a non-circular outer surface 114, a first shaft in the form of a first fastener 118 threaded with one end 106 of the middle portion 102, and a second shaft in the form of a second fastener 122 threaded with the other end 110 of the middle portion 102. In the illustrated construction of the jackshaft 66, the non-circular outer surface 114 is configured as a hexagonal outer surface 114. Alternatively, the non-circular outer surface 114 of the middle portion 102 of the jackshaft 66 may be configured in any of a number of different non-circular cross-sectional shapes (e.g., triangular, rectangular, etc.). The middle portion 102 of the jackshaft 66 also includes a cylindrical boss 126 adjacent the end 110. With reference to FIG. 6, the fasteners 118, 122 include heads 127, 128 and shanks 130, 134 extending from the heads 127, 128 of the respective fasteners 118, 122. The shank 134 of the second fastener 122, however, is stepped to yield a first shank portion 138 having a diameter substantially similar to the diameter of the shank 130 of the first fastener 118, and a second shank portion 142 having a smaller diameter than the first shank portion 138 and configured to rotatably support the pulley assembly 70.

With reference to FIG. 7, the frame 18 includes dual fixed frame members 146, 150 configured to support the jackshaft 66. One frame member 146 is positioned on an inboard side 152 of the pulley assembly 70 and includes an aperture 154 defining a central axis 158. The aperture 154 is sized to snugly receive the cylindrical boss 126 on the end 110 of the middle portion 102 of the jackshaft 66. The other frame member 150 is spaced from the one frame member 146 along the central axis 158 and includes a non-circular aperture 162 corresponding to the non-circular outer surface 114 of the middle portion 102 of the jackshaft 66 and aligned with the central axis 158. The non-circular aperture 162 is sized to snugly receive the end 106 of the middle portion 102 of the jackshaft 66. As will be discussed in more detail below, the engagement of the non-circular surface 114 of the middle portion 102 of the jackshaft 66 and the non-circular aperture 162 in the frame member 150 rotationally fixes the middle portion 102 of the jackshaft 66 with respect to the frame 18 so to not require tools to grasp the middle portion 102 while the fasteners 118, 122 are threaded into the middle portion 102.

With continued reference to FIG. 7, a detachable frame member 166 is positioned on an outboard side 170 of the pulley assembly 70 to at least partially support the pulley assembly 70 on the frame 18. The detachable frame member 166 includes an aperture 174 defining a central axis 178 that, when the detachable frame member 166 is connected to the frame 18, is coaxial with the central axis 158 of the aperture 154 in the frame member 146. The aperture 174 is sized to snugly receive the first shank portion 138 of the fastener 122.

The frame member 146 includes an upper boss 182 having two threaded apertures 186 therein and a lower boss 190 having two threaded apertures 194. The detachable frame member 166 includes a corresponding upper ear 198 having two apertures 202 and a corresponding lower ear 206 having two apertures 210. Fasteners 214 are inserted through the apertures 202 in the upper ear 198 and threaded into the threaded apertures 186 in the upper boss 182 to connect the upper ear 198 of the detachable frame member 166 to the frame 18. Likewise, similar fasteners 214 are inserted through the apertures 210 in the lower ear 206 and threaded into the threaded apertures 194 in the lower boss 190 to connect the lower ear 206 of the detachable frame member 166 to the frame 18.

With continued reference to FIG. 7, the swingarm 26 is pivotably coupled to the frame 18 about a swingarm pivot axis 218 coaxial with the respective axes 158, 178 of the aperture 154 in the frame member 146 and the aperture 174 in the detachable frame member 166. The swingarm 26 includes two bearing members 222 (e.g., bushings, roller bearings, spherical bearings, etc.) aligned with the swingarm pivot axis 218, each configured to snugly receive therein the shanks 130, 134 of the fasteners 118, 122. Particularly, the first shank portion 138 of the fastener 118 is snugly received by its associated bearing member 222. As such, the jackshaft 66 provides a pivot for the swingarm 26 in addition to a mount for the pulley assembly 70.

To assemble the swingarm 26 and the power transmission assembly 62 onto the frame 18, the middle portion 102 of the jackshaft 66 is inserted through the respective apertures 154, 162 of the frame members 146, 150 until the cylindrical boss 126 on the middle portion 102 is received within the aperture 154 of the frame member 146. The swingarm 26 may then be brought into position such that the swingarm pivot axis 218 comes into alignment with the central axis 158 of the aperture 154 in the frame member 146. The fastener 118 may then be inserted through its associated bearing member 222 and into the threaded end 106 of the middle portion 102 of the jackshaft 66. As mentioned above, one need not grasp the middle portion 102 of the jackshaft 66 with a tool to prevent the middle portion 102 from rotating during insertion of the fastener 118 into the threaded end 106 because of the engagement of the non-circular outer surface 114 of the middle portion 102 with the non-circular aperture 162 in the frame member 150.

With continued reference to FIG. 7, the pulley assembly 70 (with the first belt 74 on the pulley 78) and detachable frame member 166 may be brought into position between the frame member 146 and the swingarm 26, and the fastener 122 may be inserted through its associated bearing member 222 in the swingarm 26, through the aperture 174 in the detachable frame member 166, through the apertures 90 in the pulleys 78, 84, and into the threaded end 110 of the middle portion 102 of the jackshaft 66. As mentioned above, one need not grasp the middle portion 102 of the jackshaft 66 with a tool to prevent the middle portion 102 from rotating during insertion of the fastener 122 into the threaded end 110 because of the engagement of the non-circular outer surface 114 of the middle portion 102 with the non-circular aperture 162 in the frame member 150.

Figure 2B:
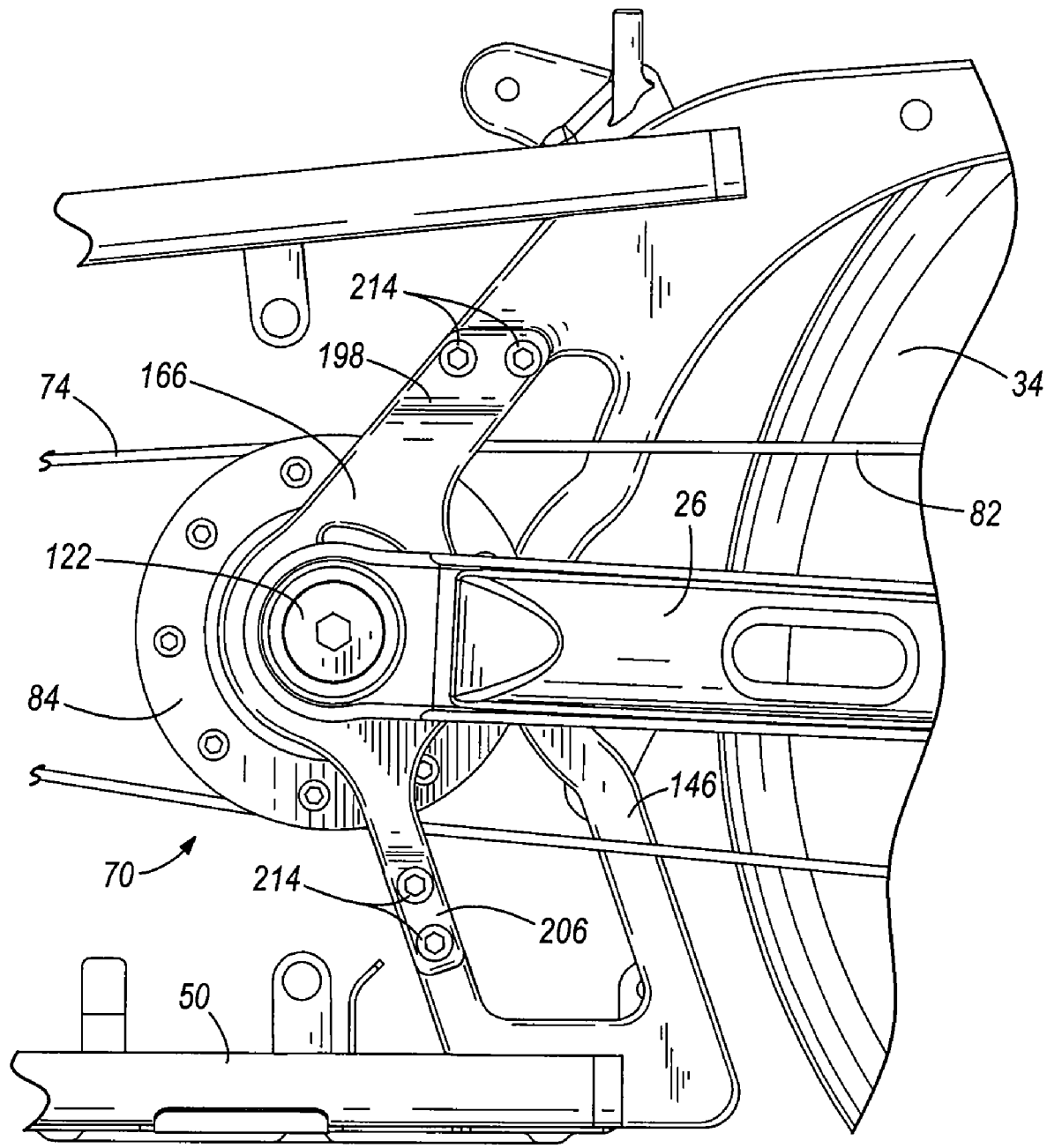
Figure 5A:
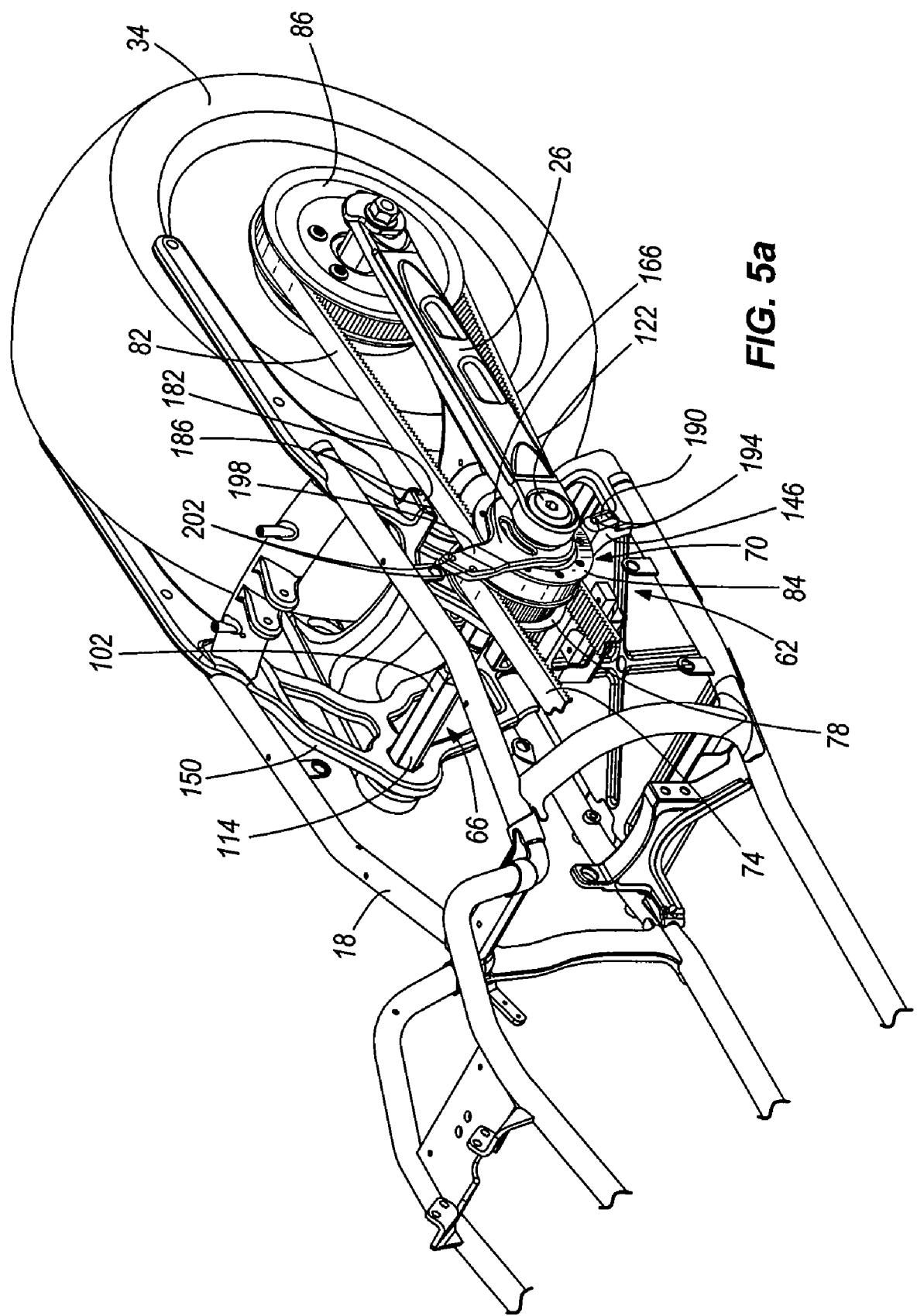
FIG. 5a is a front perspective view of the rear portion of the vehicle of FIG. 1, with portions removed, illustrating a detachable frame member that at least partially supports the pulley assembly on the frame.
Figure 5B:
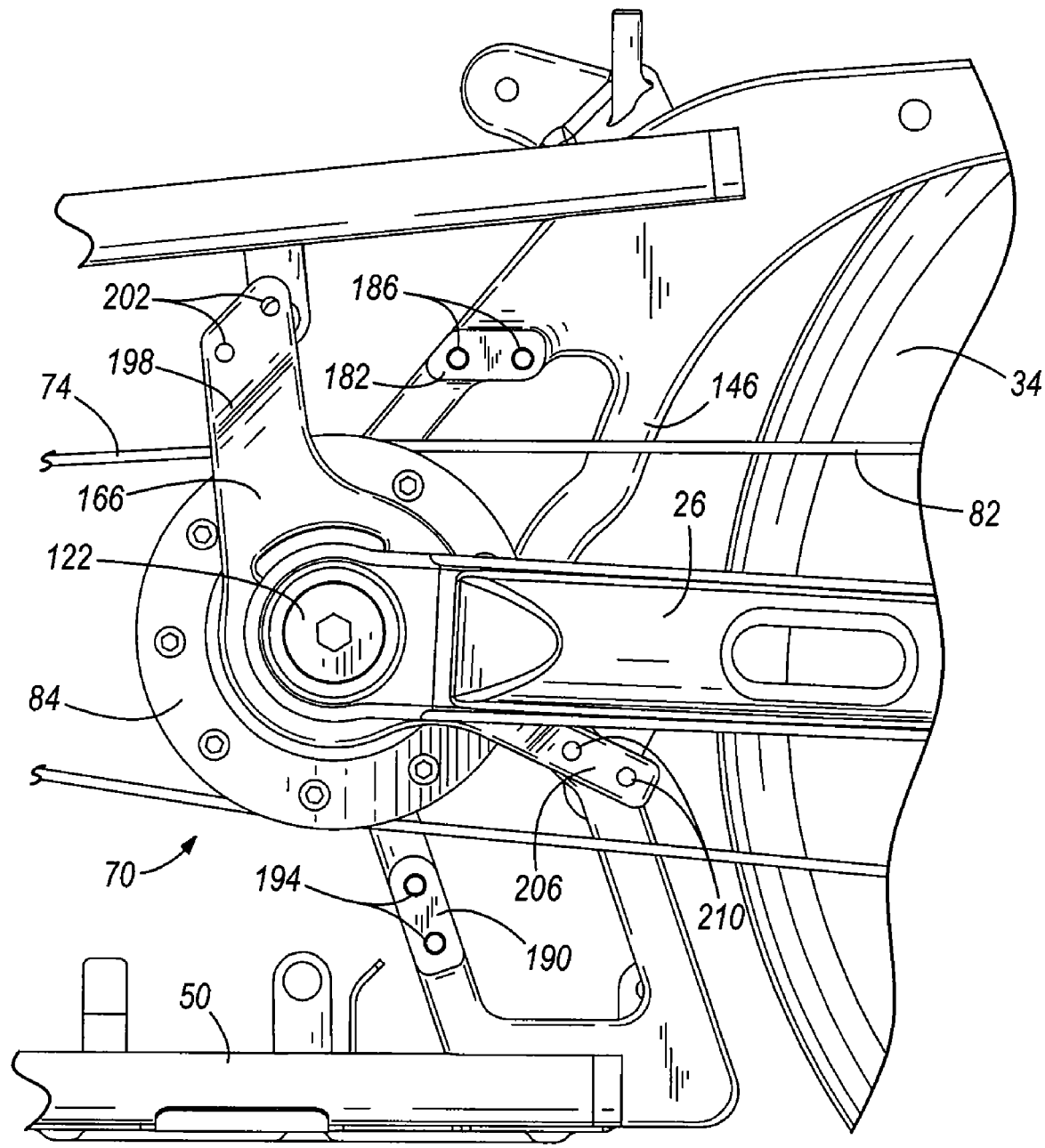

To wrap the belt 82 around the pulleys 84, 86, the detachable frame member 166 may be pivoted about the swingarm pivot axis 218 to displace the upper ear 198 from the upper boss 182 and to displace the lower ear 206 from the lower boss 190, as shown in FIGS. 5a and 5b. The belt 82 may then be inserted between the upper ear 198 of the detachable frame member 166 and the upper boss 182 on the frame member 146, and between the lower ear 206 of the detachable frame member 166 and the lower boss 190 on the frame member 146. The belt 82 may then be wrapped around the pulleys 84, 86 and tightened in a conventional manner by adjustment of the rear wheel axle. Finally, the detachable frame member 166 may be pivoted about the swingarm pivot axis 218 to align the apertures 202 in the upper ear 198 with the threaded apertures 186 in the upper boss 182 and the apertures 210 in the lower ear 206 with the threaded apertures 194 in the lower boss 190. The fasteners 214 may then be inserted into the threaded apertures 186, 194 to secure the detachable frame member 166 to the frame member 146, as shown in FIGS. 1-2b.

To remove the belt 82, the reverse of the above-described process may be employed. The fasteners 214 may first be removed from the threaded apertures 186, 194 to allow the detachable frame member 166 to pivot to the position shown in FIGS. 5a and 5b, or an alternative position to allow the belt 82 to be removed between the frame 18 and the detachable frame member 166. The belt 82 may then be loosened by adjusting the read wheel axle, removed from the pulley 86 on the rear wheel 34, and removed from the pulley 84 between the frame 18 and the detachable frame member 166. Such a belt-change procedure does not require removal of the swingarm 26, the jackshaft 66, or the pulley assembly 70 from the frame 18 of the vehicle 10.

Various features of the invention are set forth in the following claims.

What is claimed is:

1. A vehicle comprising:
   a frame including a non-circular aperture;
   a rear wheel;
   a swingarm coupling the rear wheel to the frame;
   a first shaft having a non-circular outer surface engageable with the corresponding non-circular aperture in the frame, the first shaft rotatably coupling the swingarm to the frame;
   a second shaft threaded to one end of the first shaft, the second shaft pivotably supporting one side of the swingarm with respect to the frame; and
   a third shaft threaded to the other end of the first shaft, the third shaft pivotably supporting the other side of the swingarm with respect to the frame.

2. The vehicle of claim 1, further comprising:
   a drive assembly supported by the frame; and
   a pulley assembly supported for rotation on the frame and positioned between the drive assembly and the rear wheel, the pulley assembly transferring power generated by the drive assembly to the rear wheel, wherein the pulley assembly is supported for rotation on the frame by one of the second shaft and the third shaft.

3. The vehicle of claim 1, wherein the second shaft includes a shank engageable with the swingarm to pivotably support the swingarm with respect to the frame, and wherein the third shaft includes a shank engageable with the swingarm to pivotably support the swingarm with respect to the frame.

4. The vehicle of claim 1, wherein the second shaft includes a fastener having a head and a shank extending from the head, and wherein the third shaft includes a fastener having a head and a shank extending from the head.

5. The vehicle of claim 4, wherein the shank of the second shaft is engageable with the swingarm to pivotably support the swingarm with respect to the frame, and wherein the shank of the third shaft is engageable with the swingarm to pivotably support the swingarm with respect to the frame.

6. The vehicle of claim 1, wherein the non-circular outer surface of the shaft includes a hexagonal outer surface, and wherein the corresponding non-circular aperture in the frame includes a hexagonal aperture.

7. The vehicle of claim 1, wherein the shaft further includes a cylindrical boss raised above the non-circular outer surface, and wherein the cylindrical boss is configured to be engaged with a corresponding aperture in the frame to at least partially support the shaft on the frame.

8. A method of assembling a rear swingarm to a frame of a vehicle, the method comprising:
   providing a shaft having a non-circular outer surface;
   positioning the shaft within a corresponding non-circular aperture in the frame to at least partially support the shaft on the frame;
   pivotably supporting one side of the swingarm with a shank of a second shaft;
   threadably engaging the second shaft to one end of the first shaft;
   pivotably supporting the other side of the swingarm with a shank of a third shaft; and
   threadably engaging the third shaft to the other end of the first shaft.

9. The method of claim 8, further comprising:
   providing a cylindrical boss on the first shaft raised above the non-circular outer surface; and
   positioning the cylindrical boss within a corresponding aperture in the frame to at least partially support the first shaft on the frame.

10. The method of claim 8, further comprising:
    providing a pulley assembly configured to transfer power from a drive assembly of the vehicle to a rear wheel of the vehicle; and
    rotatably supporting the pulley assembly on one of the second shaft and the third shaft.

11. A vehicle comprising:
    a frame including a non-circular aperture;
    a rear wheel;
    a swingarm coupling the rear wheel to the frame; and
    a shaft having a non-circular outer surface engageable with the corresponding non-circular aperture in the frame, the shaft rotatably coupling the swingarm to the frame;
    wherein the non-circular outer surface of the shaft includes a hexagonal outer surface, and wherein the corresponding non-circular aperture in the frame includes a hexagonal aperture.

12. The vehicle of claim 11, wherein the shaft is a first shaft, and wherein the vehicle further comprises:
    a second shaft threaded to one end of the first shaft, the second shaft pivotably supporting one side of the swingarm with respect to the frame; and
    a third shaft threaded to the other end of the first shaft, the third shaft pivotably supporting the other side of the swingarm with respect to the frame.

13. The vehicle of claim 12, further comprising:
    a drive assembly supported by the frame; and
    a pulley assembly supported for rotation on the frame and positioned between the drive assembly and the rear wheel, the pulley assembly transferring power generated by the drive assembly to the rear wheel, wherein the pulley assembly is supported for rotation on the frame by one of the second shaft and the third shaft.

14. The vehicle of claim 12, wherein the second shaft includes a fastener having a head and a shank extending from the head, and wherein the third shaft includes a fastener having a head and a shank extending from the head.

15. The vehicle of claim 14, wherein the shank of the second shaft is engageable with the swingarm to pivotably support the swingarm with respect to the frame, and wherein the shank of the third shaft is engageable with the swingarm to pivotably support the swingarm with respect to the frame.

16. The vehicle of claim 11, wherein the shaft further includes a cylindrical boss raised above the hexagonal outer surface, and wherein the cylindrical boss is configured to be engaged with a corresponding aperture in the frame to at least partially support the shaft on the frame.

* * * * *